UNITED STATES PATENT OFFICE.

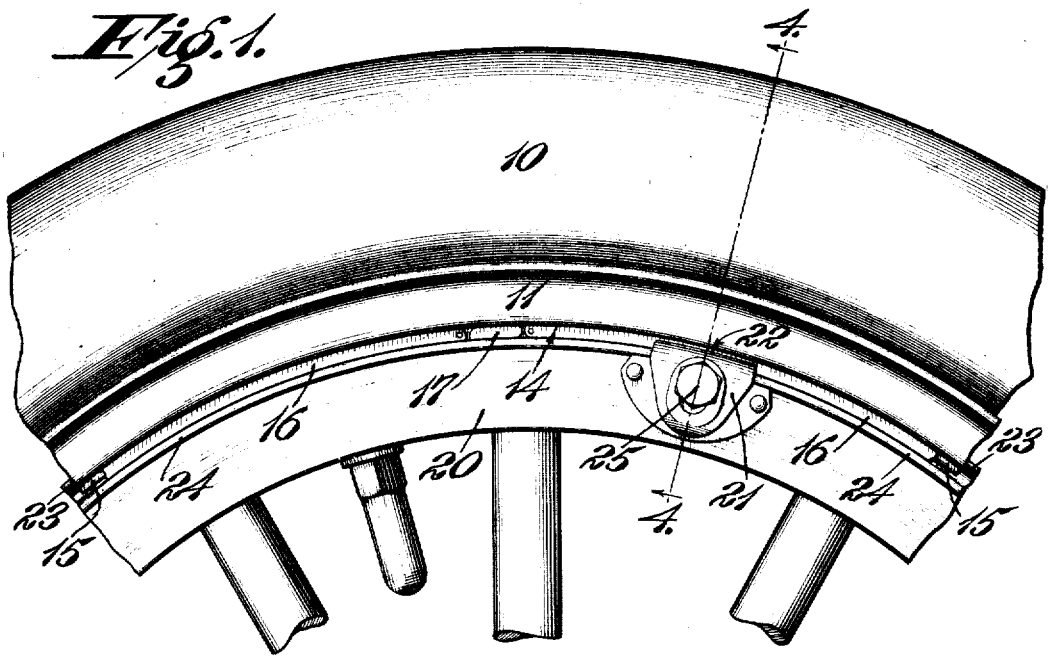
W. M. WIRTH.
DEMOUNTABLE RIM FOR WHEELS.
APPLICATION FILED JUNE 8, 1916.
1,268,526. Patented June 4, 1918.

WILLIAM M. WIRTH, OF ST. LOUIS, MISSOURI, ASSIGNOR TO ST. LOUIS WELDING AND MANUFACTURING COMPANY, OF ST. LOUIS, MISSOURI, A CORPORATION OF MISSOURI.

DEMOUNTABLE RIM FOR WHEELS.

1,268,526.  Specification of Letters Patent.  Patented June 4, 1918.

Application filed June 8, 1916. Serial No. 102,379.

*To all whom it may concern:*

Be it known that I, WILLIAM M. WIRTH, a citizen of the United States, and a resident of the city of St. Louis and State of Missouri, have invented a new and useful Improvement in Demountable Rims for Wheels, of which the following is a specification.

This invention relates particularly to rims for pneumatic tires for vehicle wheels, but it is applicable to grooved rims of all kinds, and it consists in improvements on the rim shown and described in my Patent No. 1,094,509, dated April 28, 1914.

The object of the invention is to provide a strong demountable rim which may be readily applied to and removed from the wheel, and which, when off the wheel, may be easily and quickly detached from or applied to a deflated tire, but which cannot be detached from an inflated tire either on or off the wheel.

Reference is made to the accompanying drawings, which form a part of this specification, and which illustrate the invention in a preferred form. Further details of the invention appear hereinafter; and that part of the improvement as claimed herein is set forth in the appended claims.

In the drawings, wherein the same reference characters are used to designate the same parts in the several views, Figure 1 is a side view of a portion of a pneumatic tired wheel fitted with a rim embodying the invention;

Fig. 2 is a view of a portion of the inside of the rim and tire, removed from the wheel, showing the safety lock for the rim;

Fig. 3 is a cross-section of the rim and tire off of the wheel, the section being taken at the valve on the line 3—3 in Fig. 2; and Fig. 4 is a cross-section of the rim and tire assembled on the wheel, the section being taken at the clip on the line 4—4 in Fig. 1.

The drawings illustrate the invention as applied to a pneumatic tire 10 having straight sides, but it is applicable to clencher tires and to special shapes as well.

The demountable rim is made in two separable sections each having a flange 11 suitable for the tire for which it is intended. The rim sections are alike except that the inner rim section has a wide base 12 with a hole through it for the stem 13 of the tire valve. The outer rim section has a narrow base 14, and both rim sections have inturned flanges 15 along the meeting edges of their bases. The rim sections are held together by a channel shape locking ring 16 which is arranged inside of the base portions of the demountable rim with its edges straddling the flanges 15.

The locking ring is split, and its two ends are connected by a link 17 pivoted thereto and actuated by a handle 18. The link and handle are curved to the same radius as the ring, and lie flatwise against the base flanges of the demountable rim in locked position. By pulling the handle 18 radially inwardly one end of the locking ring is sprung in away from the rim and the locking ring can be slipped off of the flanges 15 and the outer rim section freed of the inner section to permit removal of the tire.

The end of the handle 18 of the link which expands the locking ring is formed into a hook 19 which embraces the stem 13 of the tire valve in locked position, and which holds the handle against inward movement to loosen the locking ring when the tire is inflated. When the tire is deflated, the valve stem 13 can be pushed in, and the handle 18 is left free for movement inwardly. The flanges 15 are notched at one point on the periphery of the rim, and the link 17 fits between these notches to prevent creeping of the ring 16 around within the rim.

The demountable rim is attached to the wheel felly 20 by means of six or more clips 21 which have inturned edges 22 which engage against the outer side of the locking ring 16 to hold it from lateral movement. The inside edge of the demountable rim bears against an outwardly flaring flange 23 on the inner edge of the metal rim 24 of the wheel felly. The clips are held in place by transverse bolts 25 in the felly which screw into nuts 26 having flat sides which bear against the flange 23 to hold them solid.

The ring 16 is slightly larger than the rim 24 on the wheel felly so it slips off and on readily when the clips are loosened and turned out of the way. When the demountable rim is assembled on the wheel it cannot come apart, as the locking ring and link are held between the felly rim and the demountable rim and cannot be loosened.

It is evident that changes in the form and dimensions of the various parts can be made without departing from the invention, and the invention is not restricted to the detail construction shown in the drawings.

I claim the following as my invention:

1. A demountable rim comprising complementary circumferential sections for receiving a pneumatic tire, said sections being provided with inwardly projecting flanges along their meeting edges, one of said sections having a hole for the stem of the tire valve, a split locking ring of channel shape adapted to embrace said flanges, a link connecting the ends of said split locking ring for expanding it, said link being provided with a handle and said link and handle being curved to fit snugly inside of the inner periphery of said circumferential sections, and said handle having a notch adapted to embrace the stem of the tire valve whereby it is locked in expanding position when the tire is inflated.

2. A demountable rim comprising circumferential sections for receiving a pneumatic tire, said sections being provided with inwardly projecting flanges along their meeting edges, a split locking ring of channel shape adapted to embrace said flanges, a link connecting the ends of said split locking ring for expanding it, said link being provided with a handle curved to fit snugly inside of the inner periphery of said circumferential sections, and said handle being adapted to engage an inwardly projecting appurtenance of the tire to lock it in expanding position when the tire is inflated.

3. A demountable rim comprising circumferential sections for receiving a pneumatic tire, said sections being provided with inwardly projecting flanges along their meeting edges, a split locking ring of channel shape adapted to embrace said flanges, a link connecting the ends of said split locking ring for expanding it, said link being provided with a handle, and a member projecting through said rim and engaging said handle for locking it in expanding position when the tire is inflated.

4. A detachable rim for pneumatic tires, said rim consisting of separable sections, a locking member for holding said sections together, a lever for locking and unlocking said locking member and means mounted on the tire adapted to be embraced by said lever for retaining said lever in locking position whereby the rim is prevented from being detached from the tire when said tire is inflated.

5. A detachable rim for pneumatic tires, said rim consisting of separable sections, a locking member for holding said sections together, said locking member comprising a link provided with means adapted to engage the valve stem for retaining the link in locking position to prevent the rim sections from being separated from the tire while the latter is inflated.

Signed at St. Louis, Missouri, this sixth day of June, 1916.

WILLIAM M. WIRTH.